(12) United States Patent
Chung

(10) Patent No.: US 7,382,963 B2
(45) Date of Patent: Jun. 3, 2008

(54) LIGHTING APPARATUS AND PROJECTION DISPLAY APPARATUS USING THE SAME

(75) Inventor: Ji Hyouk Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 11/201,101

(22) Filed: Aug. 11, 2005

(65) Prior Publication Data

US 2006/0034083 A1 Feb. 16, 2006

(30) Foreign Application Priority Data

Aug. 11, 2004 (KR) ...................... 10-2004-0063035

(51) Int. Cl.
*G02B 6/10* (2006.01)
(52) U.S. Cl. .................... 385/146; 385/901; 362/43
(58) Field of Classification Search ................. 385/146
See application file for complete search history.

(56) References Cited

U.S. PATENT DOCUMENTS

| 5,233,679 | A | * | 8/1993 | Oyama | ....................... 385/146 |
| 5,530,940 | A | * | 6/1996 | Ludwig et al. | ................ 385/31 |
| 6,224,216 | B1 | | 5/2001 | Parker et al. | |
| 6,937,812 | B2 | * | 8/2005 | Schladenhauffen et al. | . 385/146 |
| 2005/0238222 | A1 | * | 10/2005 | Nakano et al. | ............. 382/151 |

* cited by examiner

*Primary Examiner*—Jennifer Doan
(74) *Attorney, Agent, or Firm*—McKenna Long & Aldridge LLP

(57) ABSTRACT

A lighting apparatus and projection display apparatus using the same are disclosed. The present invention includes a plurality of light sources emitting lights, respectively, each transmitting at least one of a light emitted from a different light source and a light having transmitted through the different light source and a light guiding unit sending the lights emitted from the light sources and the light transmitted through the light sources in one direction. Accordingly, the lighting apparatus can minimize the etendue to provide sufficient intensity of light despite a plurality of the light sources. By eliminating the necessity for the color separating/synthesizing unit using the lighting apparatus or by eliminating the necessity for the integrator using the lighting apparatus having the long reflecting member, the projection display system can be implemented with a simple configuration.

20 Claims, 18 Drawing Sheets

LIGHTING APPARATUS AND PROJECTION DISPLAY APPARATUS USING THE SAME

CROSS-REFERENCE TO RELATED PATENT APPLICATION

This application claims the benefit of the Korean Patent Application No. 10-2004-0063035, filed on Aug. 11, 2004, in the Korean Intellectual Property Office, the disclosure of, which is incorporated herein by reference in its entirety.

BACKGROUND OF THE INVENTION

1. Field of the Invention

The present invention relates to a lighting apparatus, and more particularly, to a lighting apparatus and projection display apparatus using the same. Although the present invention is suitable for a wide scope of applications, it is particularly suitable for minimizing etendue.

2. Description of the Related Art

Generally, a lighting apparatus can be used for a projection engine for example. An optical system of a projection engine is mainly divided into an illumination system and a projection system. A major performance of the illumination system is how efficiently the light emitted from a light source can be condensed to an imager.

If a light source is a point light source, it is theoretically able to collect all light emitted from a light source. Yet, the point light source substantially does not exist. And, all kinds of light sources have their own surfaces or volumes, respectively. Hence, theoretical limitation is put on light-condensing efficiency. Specifically, a light source used for a projection engine is an ultra high-pressure discharge lamp such as an arc lamp. Light is emitted from the arc lamp using a discharge occurring between electrodes. And, such a light source as the arc lamp is not the point light source but a light source having a length of an arc gap.

As a light source gets closer to a point light source (i.e., as an arc gap gets smaller), light-condensing efficiency becomes higher. Yet, since the arc gap is associated with an expected life span of a lamp, it is difficult to reduce the arc gap. Currently, an arc gap provided by an advanced lamp manufacturer is about 1 mmm.

Thus, since a light source has constant volume or length, theoretical light-condensing efficiency is limited by etendue. And, the etendue is defined by Formula 1.

$$\int\int \cos\theta dAd\Omega \qquad \text{[Formula 1]}$$

In this case, 'dA' indicates a unit area of a light source, 'd$\Omega$' indicates a unit solid angle of a light source, and '$\theta$' indicates an angle between a normal direction and a solid angle center of a light source.

As can be seen from Formula 1, etendue is a value associated with an area and a solid angle. A light source having a small etendue, i.e., a light source closer to a point light source can condense light to have a small area and a small solid angle using a lens or mirror. In this case, the etendue can be defined by Formula 2.

$$E=\pi A \sin^2(\theta_{1/2})=\pi A/4(F/\#)^2 \qquad \text{[Formula 2]}$$

In this case, 'A' indicates an area of a light source or imager, '$\theta_{1/2}$' indicates ½ of an angle at which the outermost of an entrance pupil of projection lens is shown at the imager and 'F/#' indicates a rate of a focus distance over a diameter of the entrance pupil.

In the side of manufacture cost, a projection engine becomes advantageous in having a smaller imager and a greater F/#. Hence, an illumination system should illuminate a small area with a big F/#, i.e., a smaller solid angle. Yet, since etendue of a light source is limited, it is unable to condense light on a small area, which is demanded by a projection system, by a small solid angle. Hence, it is unable to reduce etendue even by any kind of optical systems employing Lagrange Invariant in case that a light source has a wide area and that a projected light has a big angle for radiation. This is the limitation of the light-condensing efficiency restricted by the etendue of light source. And, a real system cannot overcome the theoretical efficiency.

Moreover, etendue of a light-receiving part that is illuminated can be calculated. In a projection engine, etendue of a MD (micro display) panel can be calculated. Namely, the etendue of the light-receiving part is determined by an area of the light-receiving part and F/# that is used. Yet, if etendue of a light source is greater than that of the light-receiving part, the light-receiving part is unable to accept rays amounting to the corresponding etendue difference. Thus, the etendue of the light source and the etendue of the light-receiving part put limitation on efficiency of a lighting apparatus. Hence, illumination designers seriously take the etendue into consideration in designing lighting apparatuses.

Meanwhile, to solve the aforesaid problems caused by the difficulty in reducing the arc lamp size associated with the expected life span of the lamp used as a light source, an LED (light emitting diode) is studied to use for a light source of a projection engine (U.S. Pat. No. 6,224,216). The LED has an expected life-span longer than that of the arc lamp, a reduced size, a lightened weight, a fast response speed, a low-voltage drive, a wide color-expression range, etc.

Since the LED fails in providing a sufficient light output as a single device so far, several LEDs are needed to secure the necessary light output.

However, the LED has its etendue as well. So, in case of using several LEDs to secure the light output, the etendue of the entire light sources is raised.

SUMMARY OF THE INVENTION

Accordingly, the present invention is directed to a lighting apparatus and projection display system using the same that substantially obviate one or more problems due to limitations and disadvantages of the related art.

An object of the present invention is to provide a lighting apparatus, by which etendue can be minimized in case of using several light sources.

Another object of the present invention is to provide a projection display apparatus using the above lighting apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a lighting apparatus according to the present invention includes a plurality of light sources emitting lights, respectively, each transmitting at least one of a light emitted from a different light source and a light having transmitted through the different light source and a light guiding unit sending the lights emitted from the light sources and the light transmitted through the light sources in one direction.

Preferably, the light guiding unit includes a reflecting member enclosing the light sources to reflect the lights emitted from the light sources and an opening is provided to the reflecting member via which at least one of the transmitted light and the reflected light leaks.

More preferably, the reflecting member has a shape selected from the group consisting of a rectangular-parallelepiped box, a peaked-hat box, a cylindrical box, a hemispherical box and a polygonal box. More preferably, an area of the opening is set smaller than a total of surface areas configuring etendue of the light sources. More preferably, a surface of the reflecting member by which the light is reflected is formed of either metal or silicon. More preferably, the light sources are attached parallel in one row to one of inner surfaces of the reflecting member to transmit the light emitted from a neighbor light source mutually. More preferably, the light sources are attached parallel in one row to two of inner surfaces of the reflecting member to transmit the light emitted from a neighbor light source mutually. More preferably, the light sources are attached to different inner surfaces of the reflecting member, respectively. More preferably, the lighting apparatus further includes a refractive layer having a refraction index smaller than that of the corresponding light source and greater than that of air to cover at least one of the light sources.

More preferably, the reflecting member is filled up with the refractive layer. More preferably, a light-emitting surface of the refractive layer is hemispherical.

Preferably, the light guiding unit includes a plurality of optical units provided between a plurality of the light sources, respectively and each of the optical units guides the light emitted from a neighbor light source to another neighbor light source.

Preferably, each of a plurality of the light sources includes a light emitting diode (LED). Preferably, a plurality of the light sources emit the lights of different colors, respectively.

In another aspect of the present invention, in a projection display system using the above lighting apparatus, a projection display system using at least one lighting apparatus includes the at least one lighting apparatus for emitting a light and a projector synthesizing the light emitted from the at least one lighting apparatus, the projector enlarging a synthesized result to form an image.

Preferably, the projector corresponds to a reflective 3-panel type, a transmissive 3-panel type or a DLP 1-panel type. Preferably, the projection display system including an imager further includes an integrator uniformly applying the light emitted from the lighting apparatus to the imager to correspond to a shape of the imager and the projector enlarges a size of the imager to form an image on a screen.

In another aspect of the present invention, in a projection display system using the above lighting apparatus, a projection display system using at least one lighting apparatus includes the at least one lighting apparatus for emitting a light and a projector synthesizing the light emitted from the at least one lighting apparatus and enlarging a synthesized result to form an image.

Preferably, a length of the reflecting member included in the lighting apparatus is formed long enough for the light to be uniformly emitted from the reflecting member.

Preferably, the lighting apparatus includes the at least one or more light sources emitting a plurality of lights of different colors, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a configuration and operation of a lighting apparatus according to the present invention are explained with reference to the attached drawings as follows.

Figure 1:
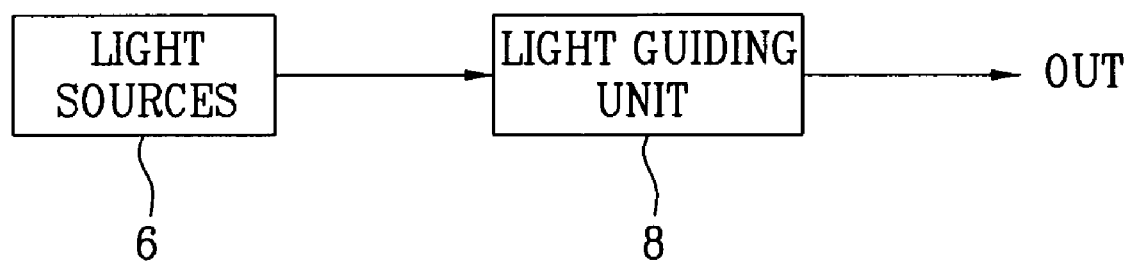
FIG. 1 is a block diagram of a lighting apparatus according to the present invention.

FIG. 1 is a block diagram of a lighting apparatus according to the present invention.

Referring to FIG. 1, while a plurality of light sources 6 emit lights, respectively, each of the light sources 6 can transmit at least one of the light emitted from another light source and the light having transmitted through another light source 6. In doing so, a light guide unit 8 sends the lights emitted from the light sources 6 and the lights having transmitted through the light sources 6 in one direction via an output terminal OUT.

Configurations and operations of the lighting apparatus shown in FIG. 1 according to various embodiments of the present invention are explained with reference to the attached drawings as follows.

Figure 2A:
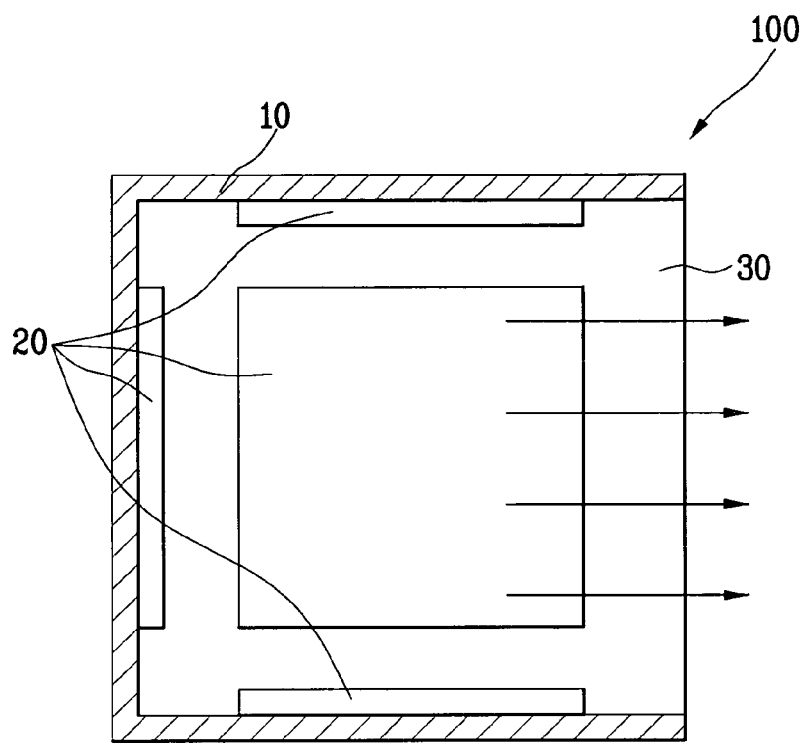
FIGS. 2A to 2C are diagrams of the lighting apparatus shown in FIG. 1 according to one embodiment of the present invention.
Figure 2B:
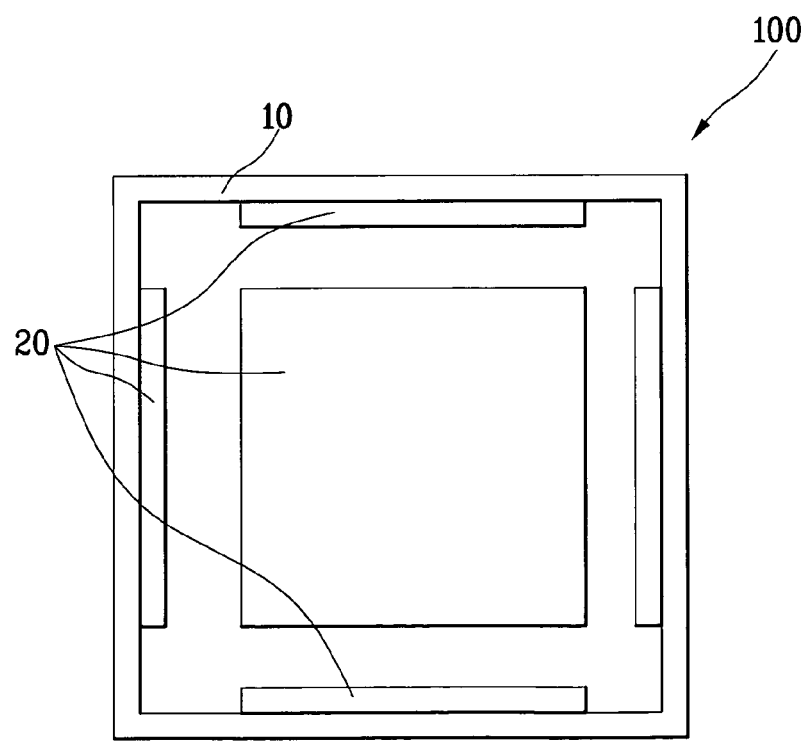
Figure 2C:
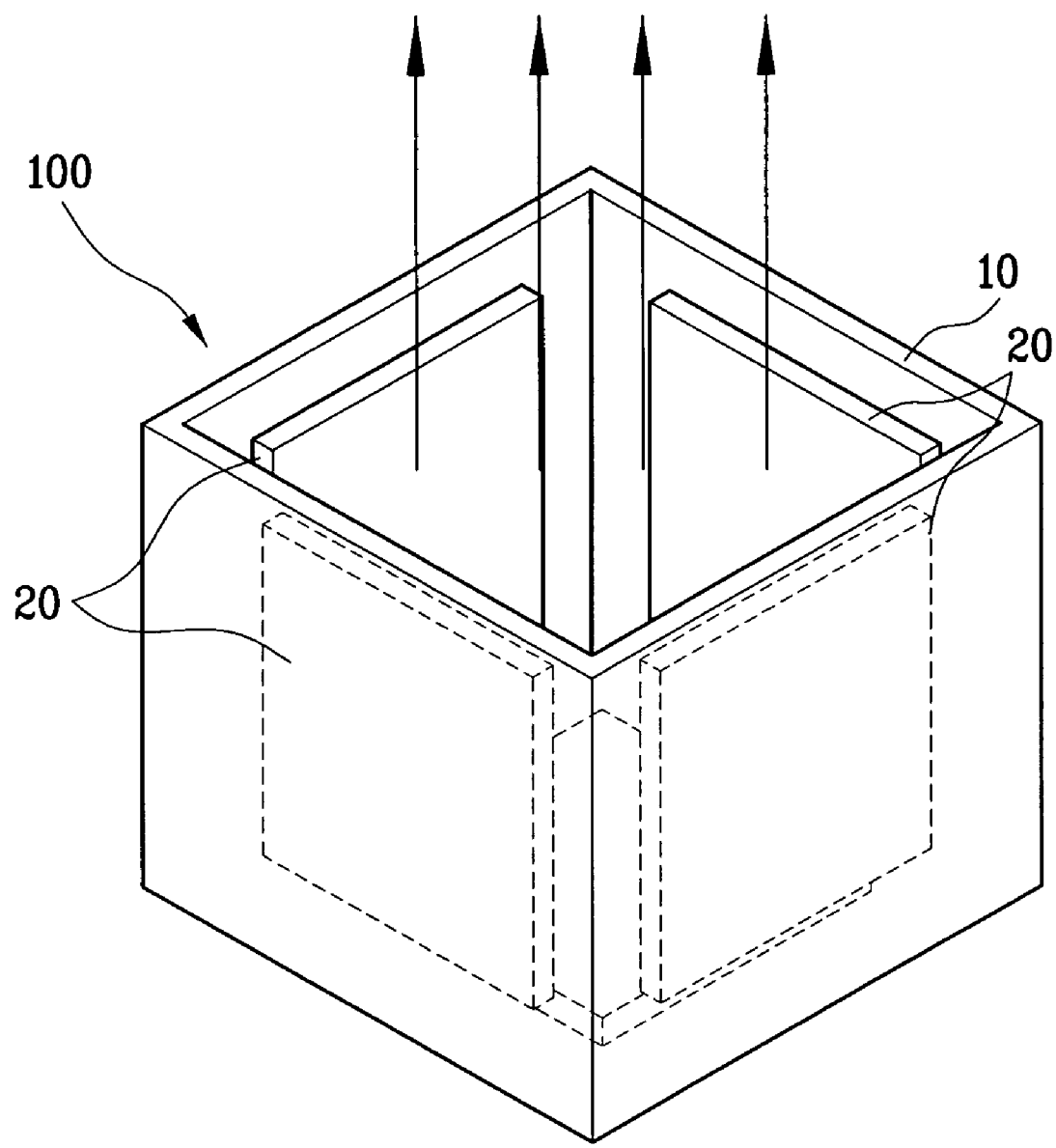

FIGS. 2A to 2C are diagrams of the lighting apparatus 100 shown in FIG. 1 according to one embodiment of the present invention. FIG. 2A is a cross-sectional diagram of the lighting apparatus, FIG. 2B is a right-side diagram of the lighting apparatus, and FIG. 2C is a perspective diagram of the lighting apparatus.

Referring to FIGS. 2A to 2C, a light-guiding unit 8 can include a reflecting member 10. In this case, the reflecting member 10 encloses light sources 20 and reflects lights emitted from the light sources 20. And, the reflecting member 10 includes at least one opening 30 through which at least one of the light emitted from the light sources 20, the light having transmitted through the light sources 20 and the reflected light leaks.

Figure 3A:
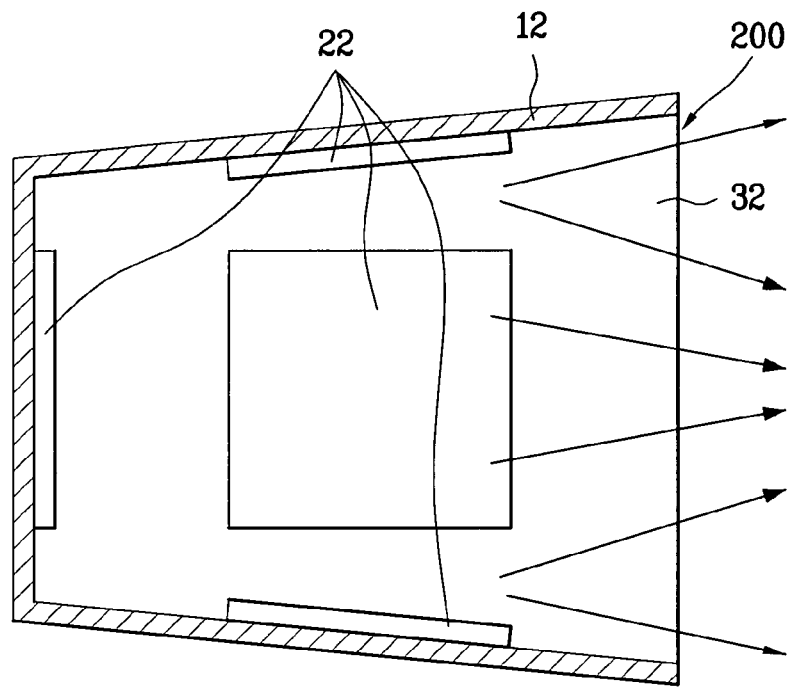
FIGS. 3A to 3D are diagrams of the lighting apparatus shown in FIG. 1 according to another embodiment of the present invention.
Figure 3B:
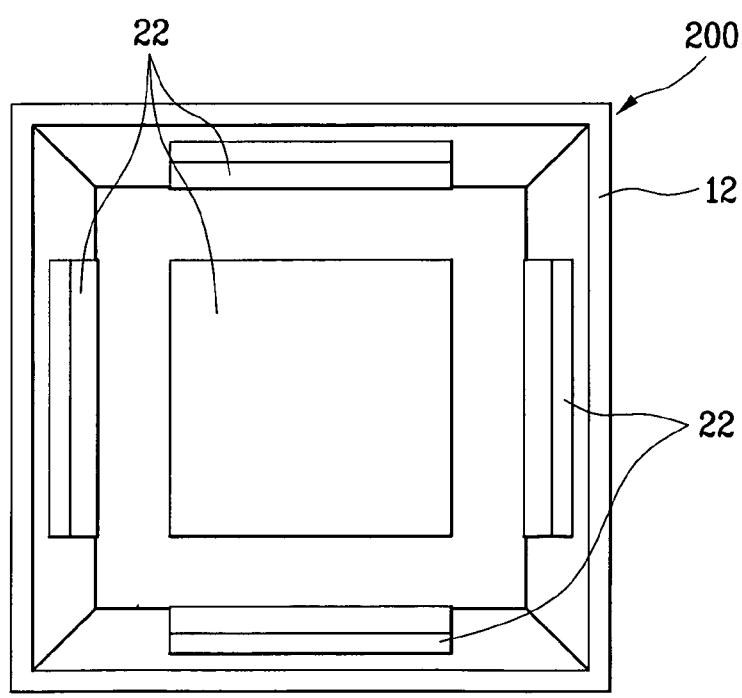
Figure 3C:
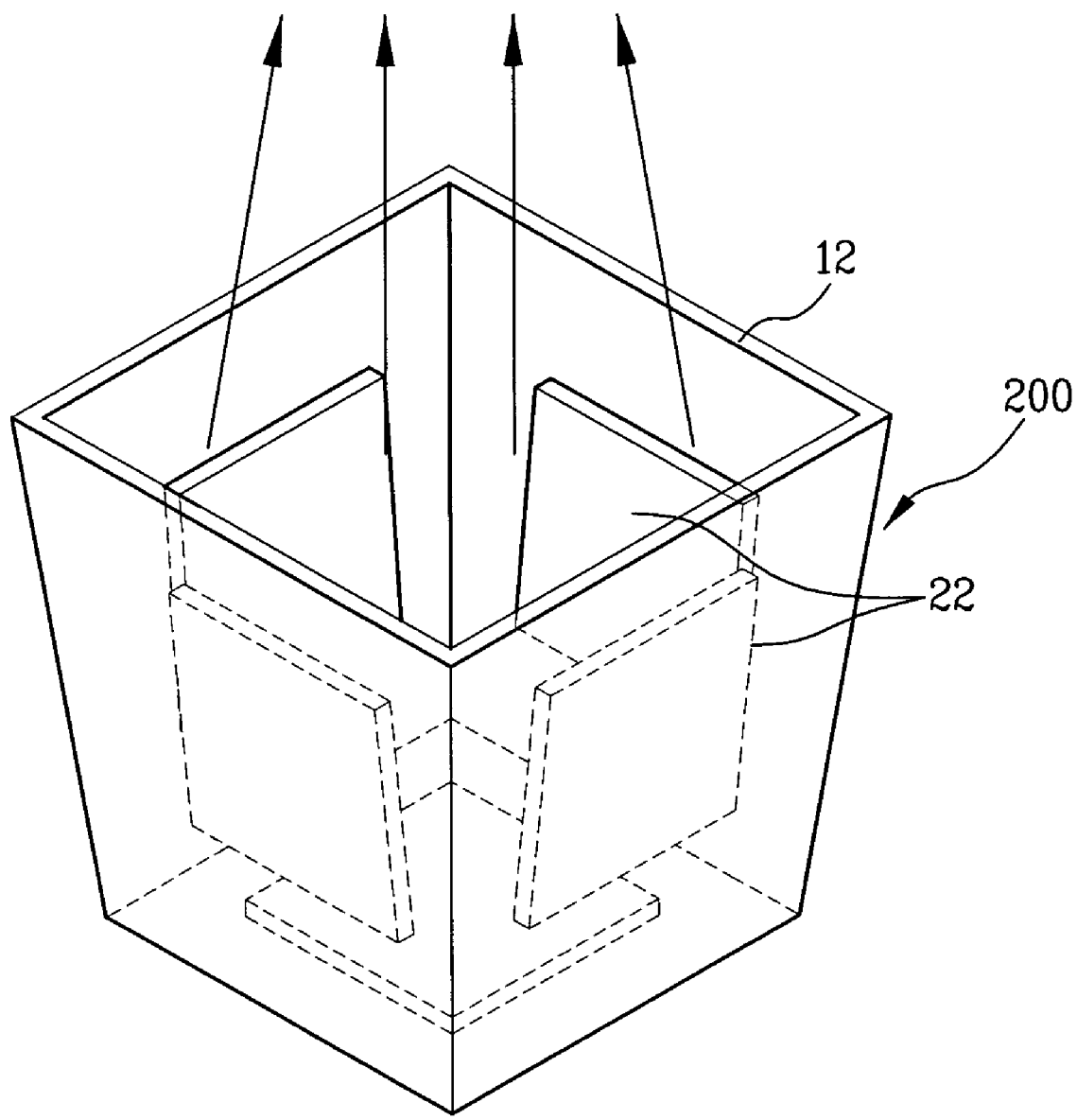
Figure 3D:
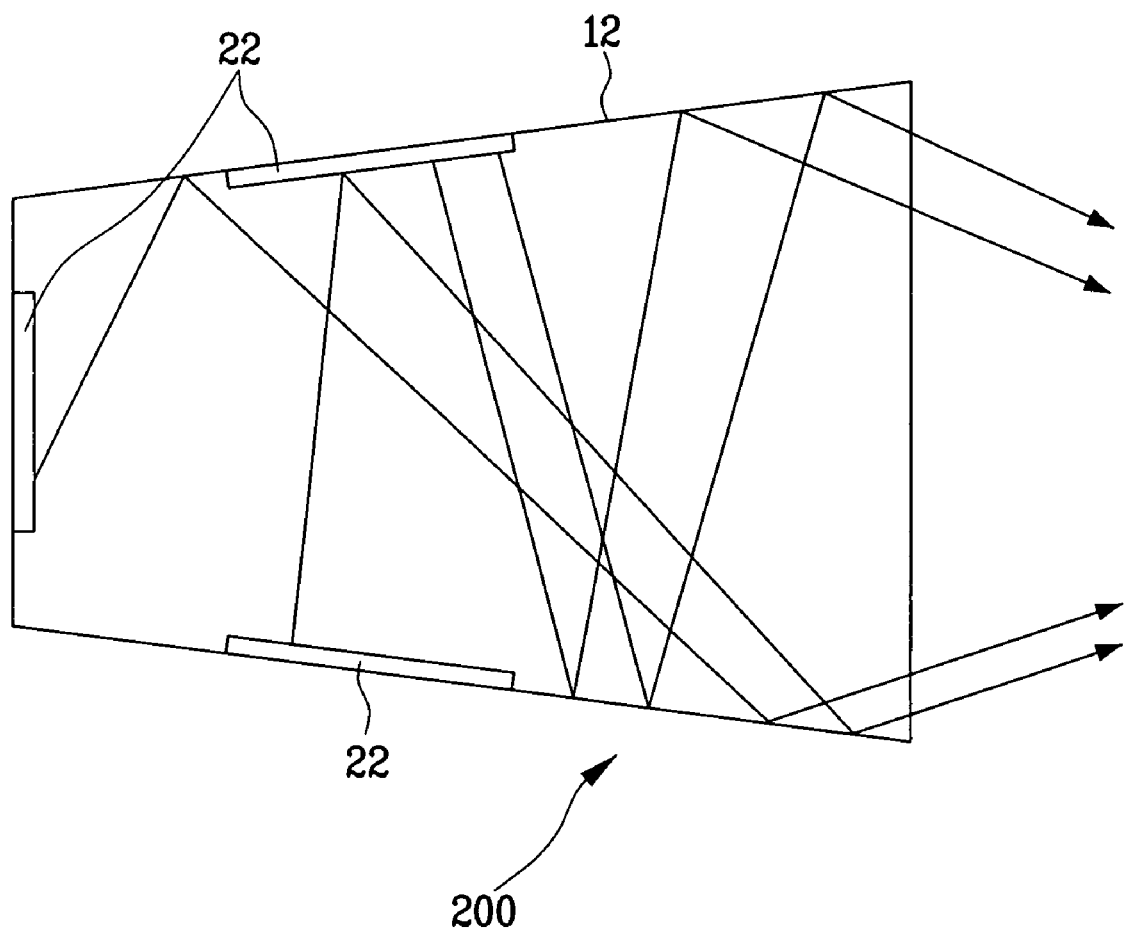

FIGS. 3A to 3D are diagrams of the lighting apparatus shown in FIG. 1 according to another embodiment 200 of the present invention. FIG. 3A is a cross-sectional diagram of the lighting apparatus, FIG. 3B is a right-side diagram of the lighting apparatus, FIG. 3C is a perspective diagram of the lighting apparatus, and FIG. 3D is a cross-sectional diagram of the lighting apparatus for explaining a light path.

The lighting apparatus shown in FIGS. 3A to 3D play the same role of that shown in FIGS. 2A to 2C. Yet, the reflecting member of the lighting apparatus shown in FIGS. 2A to 2C has a rectangular shape, whereas the reflecting member of the lighting apparatus shown in FIGS. 3A to 3C has a peaked hat shape. Namely, except the shape difference, the reflecting member 12 shown in FIGS. 3A to 3D plays the same role of the reflecting member 10 shown in FIGS. 2A to 2C. Moreover, light sources 22 shown in FIGS. 3A to 3D play the same role of the light sources 20 shown in FIGS. 2A to 2C.

In case that the shape of the reflecting member 12 is implemented to have the peaked hat shape different from the rectangular shape of the reflecting member 10, the number of reflections of the lights emitted from the light sources 22 within the reflecting member 12 is reduced. Hence, it is able to reduce a quantity of the lights to be lost when the lights that are emitted from the light sources 22 is reflected by an inner surface of the reflecting member 12. Moreover, the angle of the light, which is emitted from the corresponding light source 22 and is reflected by a peaked hat type reflecting surface, escaping via the opening can be mitigated as shown in FIG. 3D. In doing so, if a length of the reflecting member 12 is increased, an area of the opening 32 of the peaked-hat-shape reflecting member 12 becomes bigger than that of the opening 30 of the rectangular reflecting member 10. Thus, if the area of the opening 32 is bigger than a total of surface areas of the light sources 22 provided within the reflecting member 12, etendue can be increased. Yet, since the angle of the light escaping via the opening 32 is mitigated, etendue of the light escaping via the opening 32 of the lighting apparatus can be smaller than a total of etendue of the light sources 22 provided within the reflecting member 12.

Therefore, even if the reflecting member 12 is configured to have the peaked hat shape, overall etendue of the lighting apparatus is smaller than a total of the etendue of the entire light sources. Hence, by allowing the etendue of the light emitted from the lighting apparatus shown in FIGS. 3A to 3D to be smaller than that of the light emitted from the lighting apparatus shown in FIGS. 2A to 2C, light source efficiency can be raised more.

Figure 4A:
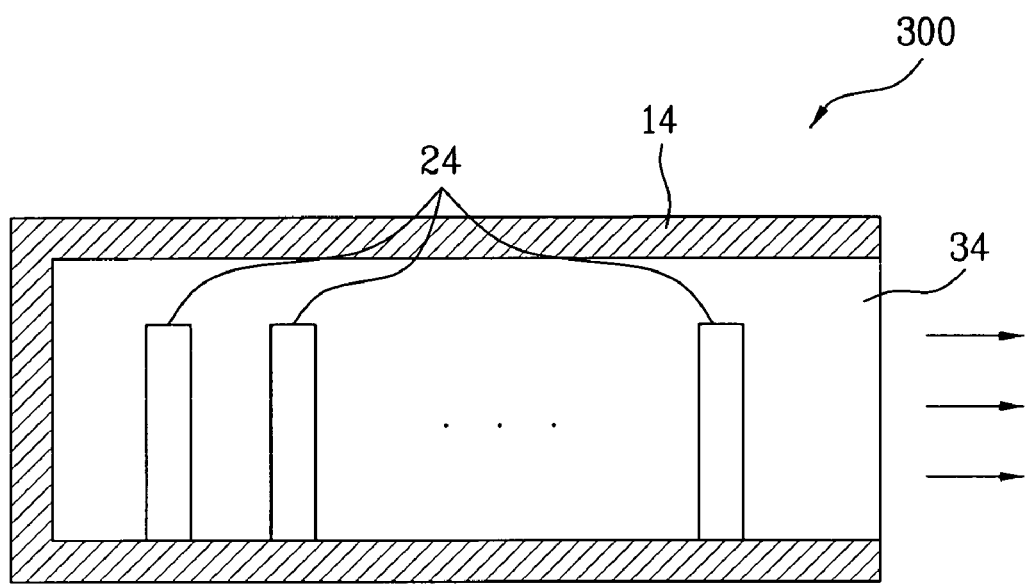
FIGS. 4A to 4C are diagrams of the lighting apparatus shown in FIG. 1 according to another embodiment of the present invention.
Figure 4B:
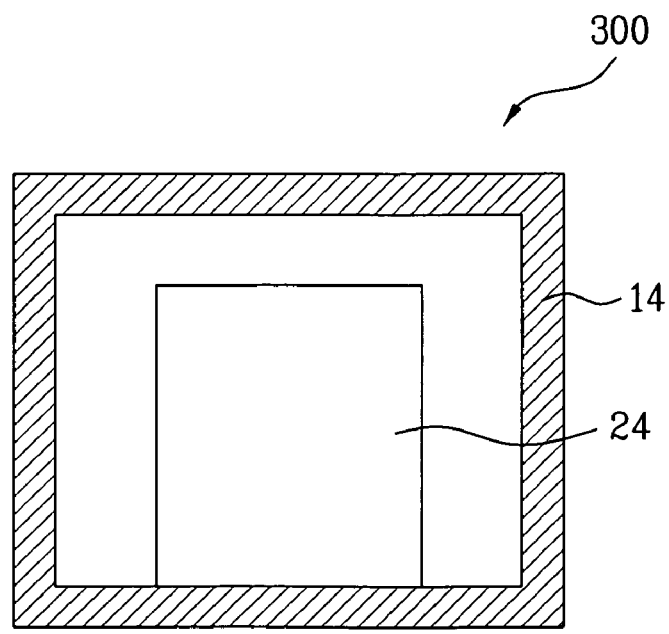
Figure 4C:
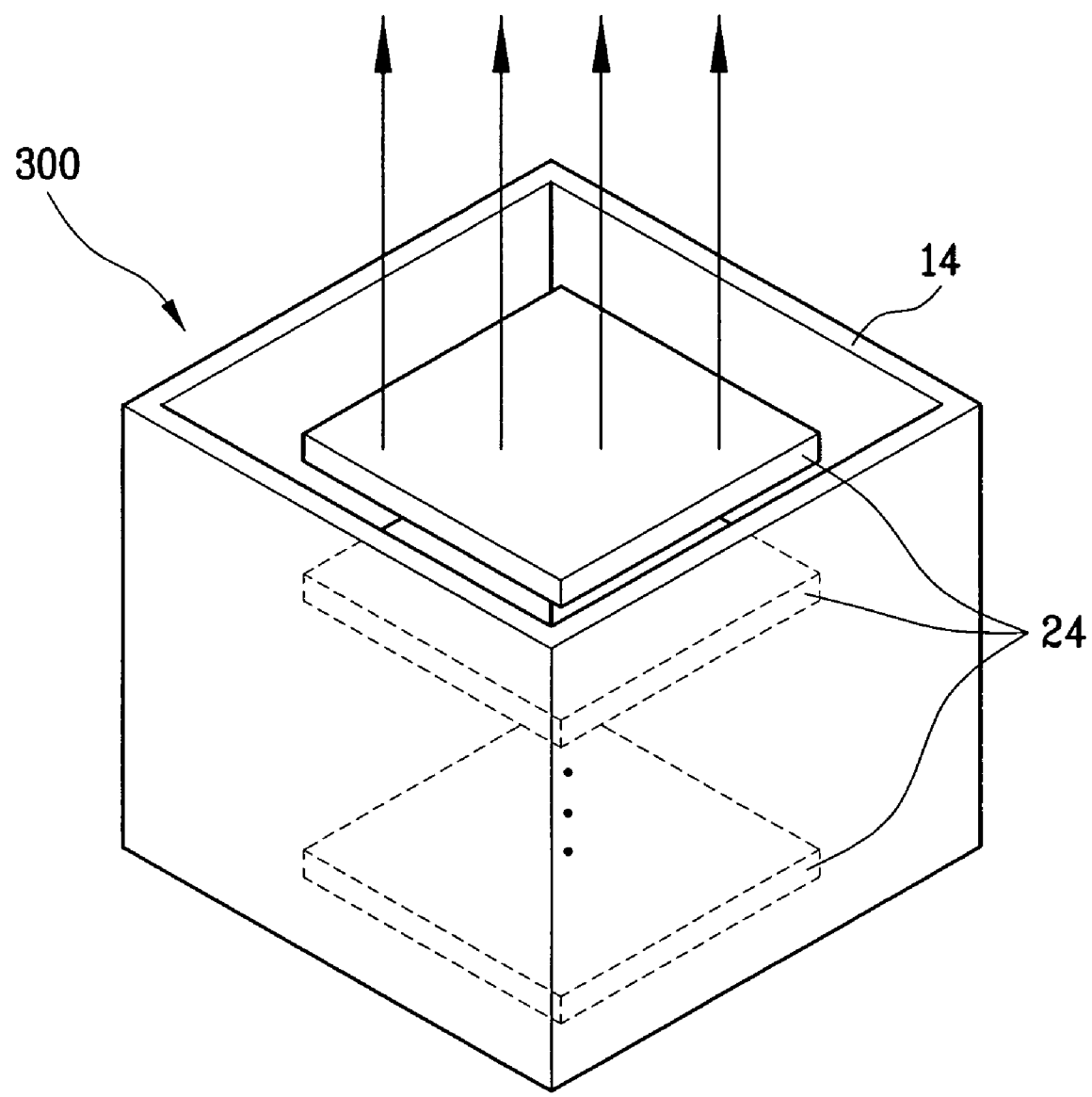

FIGS. 4A to 4C are diagrams of the lighting apparatus shown in FIG. 1 according to another embodiment 300 of the present invention. FIG. 4A is a cross-sectional diagram of the lighting apparatus, FIG. 4B is a right-side diagram of the lighting apparatus, and FIG. 4C is a perspective diagram of the lighting apparatus.

Figure 5A:
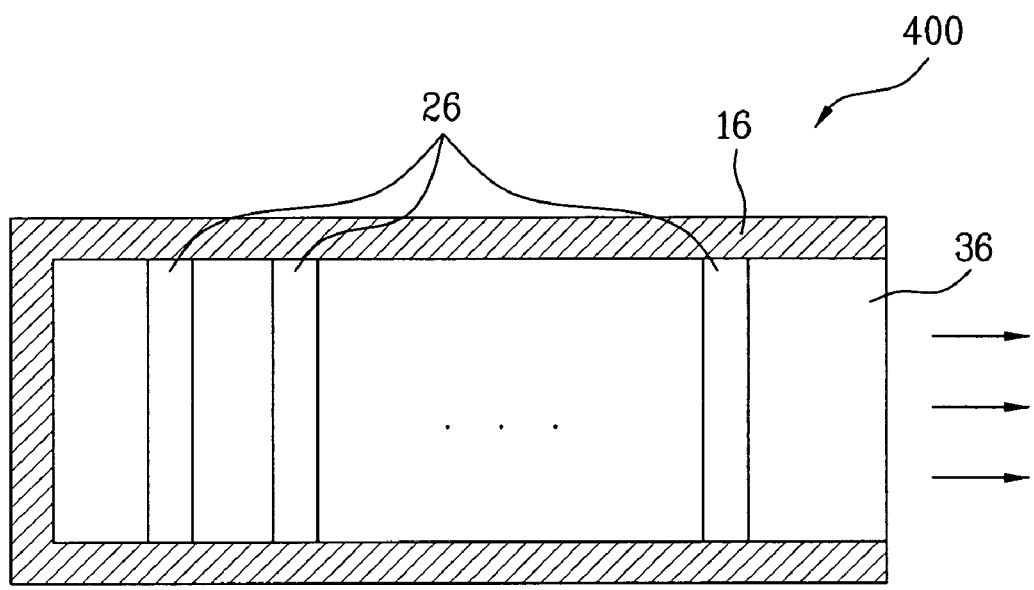
FIGS. 5A to 5C are diagrams of the lighting apparatus shown in FIG. 1 according to another embodiment of the present invention.
Figure 5B:
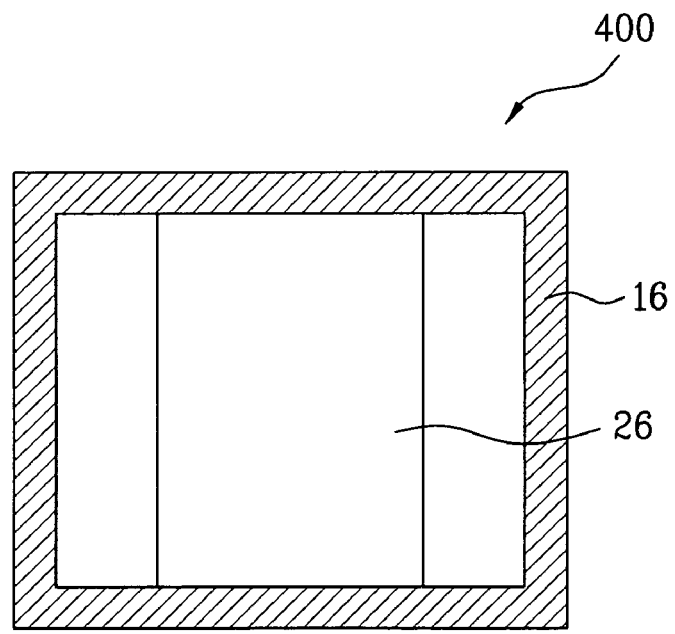
Figure 5C:
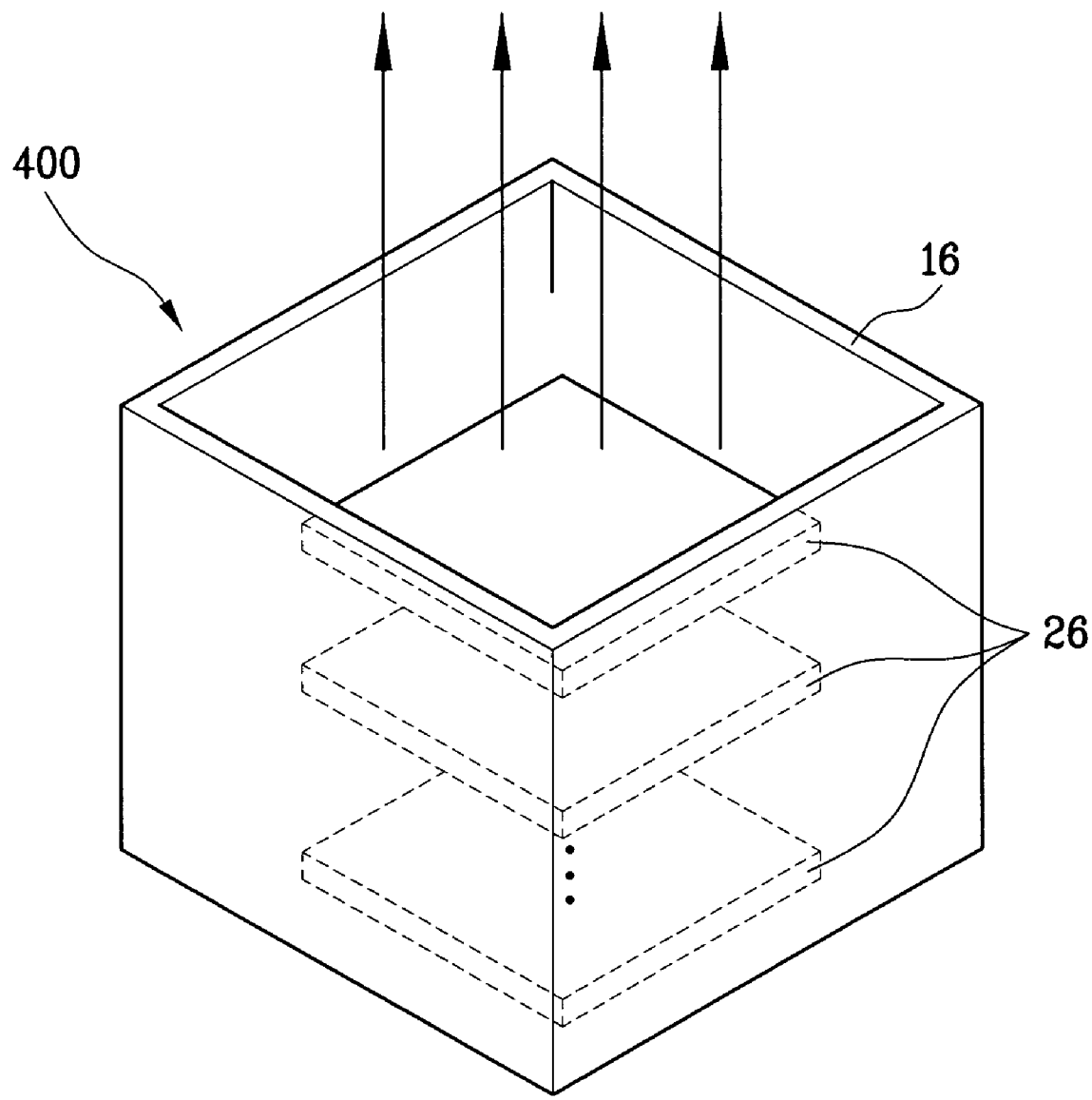

FIGS. 5A to 5C are diagrams of the lighting apparatus shown in FIG. 1 according to another embodiment 400 of the present invention. FIG. 5A is a cross-sectional diagram of the lighting apparatus, FIG. 5B is a right-side diagram of the lighting apparatus, and FIG. 5C is a perspective diagram of the lighting apparatus.

The light sources 20 of the lighting apparatus, as shown in FIGS. 2A to 2C, are attached to different inner surfaces of the reflecting member 10.

Yet, light sources 24 of the lighting apparatus, as shown in FIGS. 4A to 4C, are sequentially attached parallel to each other to one inner surface of a reflecting member 14 to transmit lights emitted from neighbor light sources. Light sources 26 of the lighting apparatus, as shown in FIGS. 5A to 5C, are sequentially attached parallel to each other to two inner surfaces of a reflecting member 16 to transmit the light emitted from a neighbor light source. Namely, in case of FIGS. 4A to 4C or FIGS. 5A to 5C, the light emitted from the light source located at a left side is transmitted through the light source located at a right side to escape via an opening 34 or 36 finally.

Figure 6:
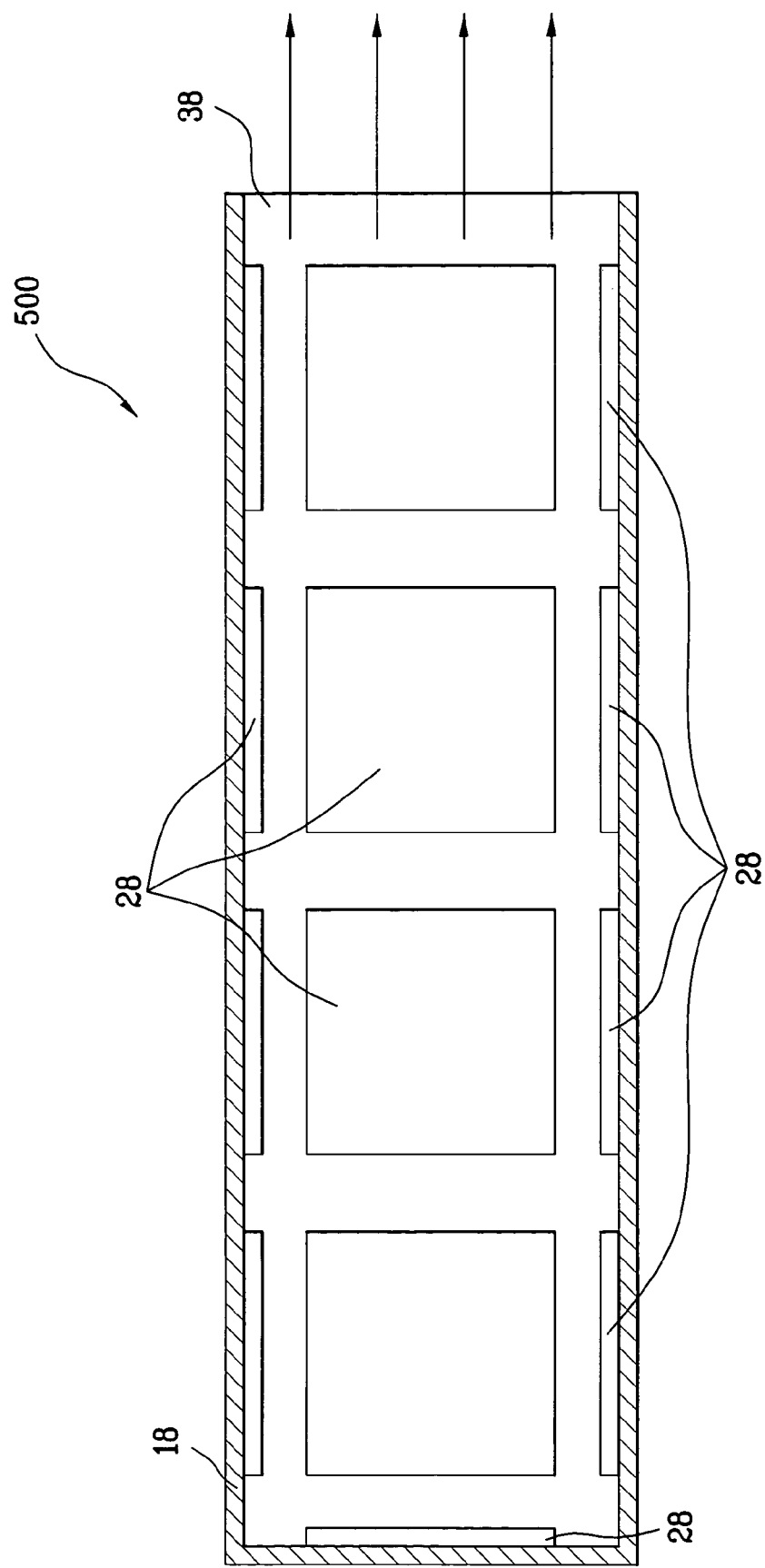
FIG. 6 is a diagram of the lighting apparatus shown in FIG. 1 according to another embodiment of the present invention.

FIG. 6 is a diagram of the lighting apparatus shown in FIG. 1 according to another embodiment 500 of the present invention.

Referring to FIG. 6, a lighting apparatus 500 according to another embodiment of the present invention includes a reflecting member 18 and a plurality of light sources 28.

The lighting apparatus 500 can be provided with the light sources more than those of the former lighting apparatus shown in FIGS. 2A to 2C to output sufficient light intensity. Namely, since the more light sources are provided, sufficient light intensity can escape from the lighting apparatus 500 via an opening 38.

Meanwhile, a refractive layer having a refraction index, which is smaller than that of the light source 20, 22, 24, 26 or 28 and is greater than that of air, can be further provided to the lighting apparatus according to each of the embodiments of the present invention to cover an emitting part of the light source 20, 22, 24, 26 or 28.

If the light sources are implemented with the material of high refraction index such as light emitting diodes (LED), there exist too many totally reflected lights due to the refraction index difference at a boundary between the light source and air to lower efficiency. Hence, by covering the light source with the refractive layer to eliminate the total reflection generated from the light source due to the refraction index difference, it is able to raise light emission efficiency.

In case that a lighting apparatus is configured as shown in FIGS. 3A to 3C, a configuration and operation of a lighting apparatus having a refractive layer according to the present invention are explained with reference to the attached drawings as follows.

Figure 7A:
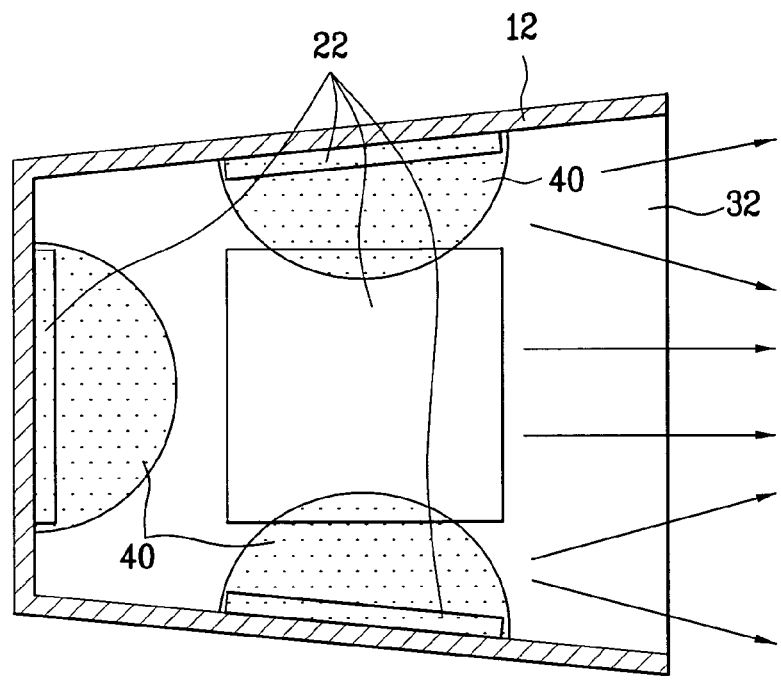
FIG. 7A and FIG. 7B are diagrams of a lighting apparatus according to another embodiment of the present invention.
Figure 7B:
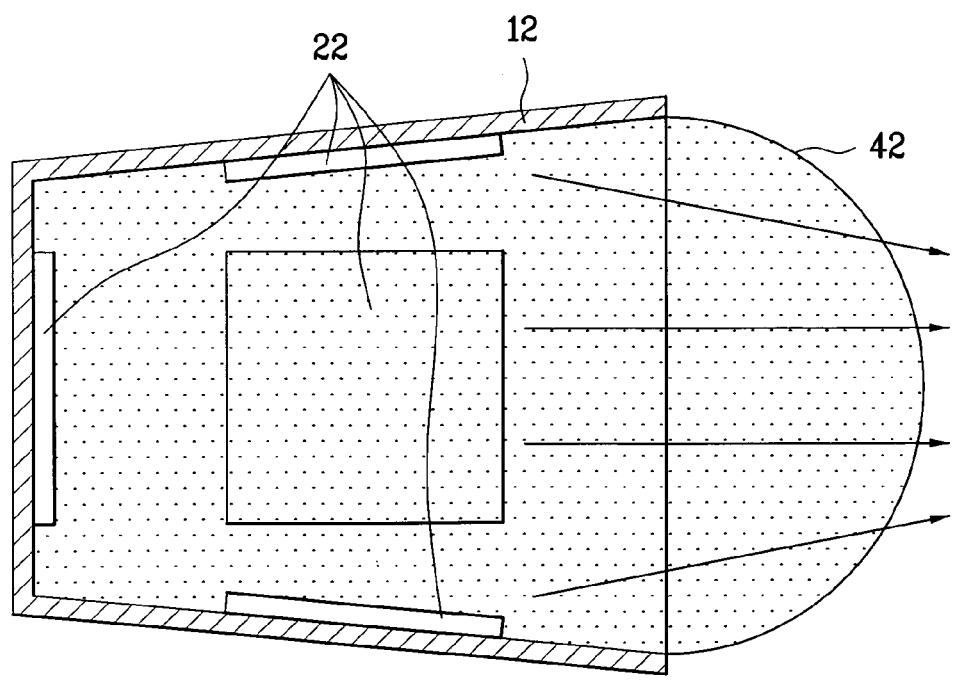

FIG. 7A and FIG. 7B are diagrams of a lighting apparatus according to another embodiment of the present invention.

FIG. 7A shows a lighting apparatus having a refractive layer according to one embodiment of the present invention and FIG. 7B shows a lighting apparatus having a refractive layer according to another embodiment of the present invention. In this case, since a reflecting member and light sources shown in FIG. 7A or FIG. 7B play the same roles of the reflecting member and light sources shown in FIG. 3A, respectively, the same reference numbers are used.

A refractive layer 40, as shown in FIG. 7A, can cover an emitting portion of each of the light sources 22. Alternatively, a refractive layer 42, as shown in FIG. 7B, can fill up an inner space of a reflecting member 12.

Referring to FIG. 7A or FIG. 7B, a surface of the refractive layer 42 via which a light comes out can have a hemispherical shape to raise light efficiency.

Meanwhile, the reflecting member of the lighting apparatus preferably has a high refraction index, for example, over 80%.

Preferably, in each of the embodiments of the lighting apparatus, an area of an opening 30, 32, 34, 36 or 38 is set smaller than a total of surface areas configuring etendue of each of the light sources 20, 22, 24 26 and 28. So, the etendue of the light coming out of the opening of the lighting apparatus can be smaller than a total of the etendue of the light sources enclosed by the reflecting member.

Since most of the light sources in the lighting apparatus emit light and generate heat, simultaneously, a heat discharging mechanism is needed. Hence, an inner surface of high refraction index is preferably formed of a material having high thermal conductivity. For this, a surface of the reflecting member of the lighting apparatus is preferably formed of metal or silicon. Optionally, a heat sink can be attached to an outer surface of the reflecting member to enhance heat dissipation.

In the lighting apparatus shown in FIGS. 2A to 2c, the reflecting member 10 is configured with the rectangular parallelepiped shape. The lighting apparatus can be configured with the peaked hat shape as shown in FIGS. 3A to 3D as well. Moreover, the reflecting member 10 of the lighting apparatus according to the present invention can be implemented into various shapes such as cylinder, hemisphere, polygonal box and the like.

Figure 8:
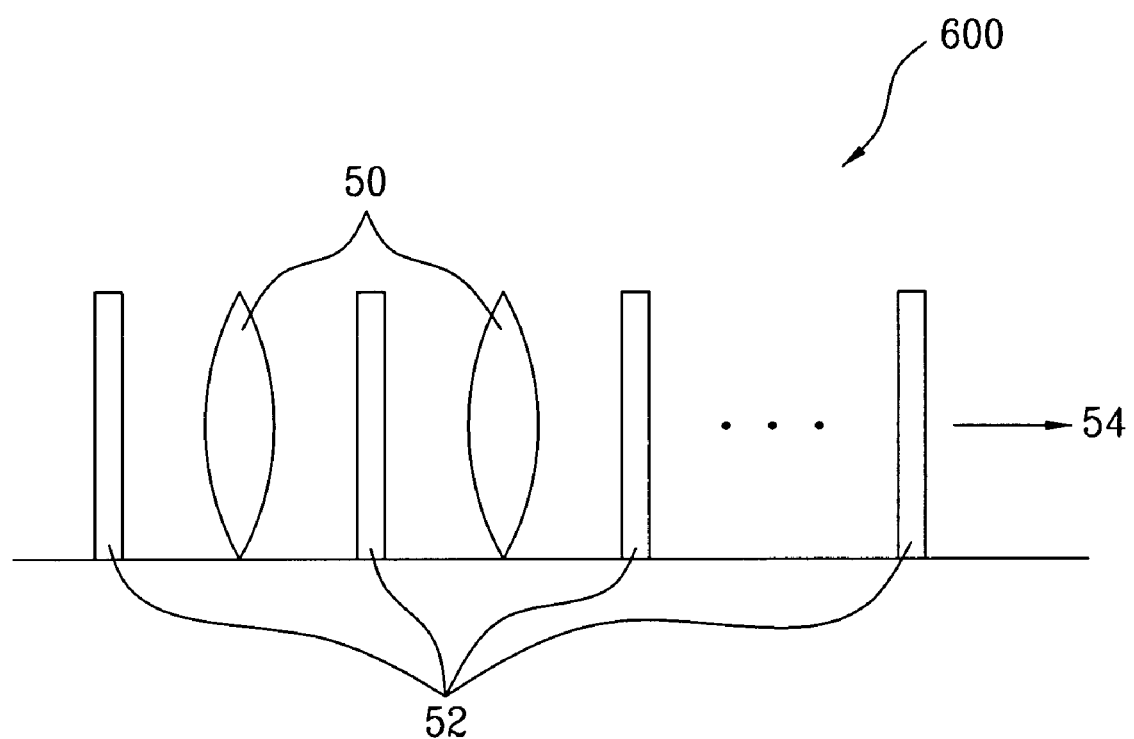
FIG. 8 is a diagram of a lighting apparatus according to another embodiment of the present invention.

FIG. 8 is a diagram of a lighting apparatus according to another embodiment of the present invention.

Referring to FIG. 8, a lighting apparatus according to another embodiment 600 of the present invention includes a plurality of light sources 52 and a plurality of optical units 50.

The light sources 52, as shown in FIG. 8, correspond to the light sources shown in FIG. 1 and play the same roles. Hence, the detailed explanation of the light sources 52 will be skipped in the following description. The light-guiding unit 8 shown in FIG. 1 can be implemented by the optical units 50 shown in FIG. 8. The optical units 50 are provided between a plurality of the light sources 52, respectively. The optical unit 50 plays a role in guiding the light emitted from one light source to a neighbor light source. In FIG. 8, the optical unit 50 applies the light, which is emitted from or is transmitted through a left-neighbor light source, to a right-neighbor light source. Hence, the light emitted from the lighting apparatus 600 shown in FIG. 8 can process in one direction 54.

In the above-explained lighting apparatuses according to the various embodiments of the present invention, each of the light sources can be implemented with a light emitting diode (LED). In this case, the light sources can emit different-color lights, respectively.

Therefore, in the above-explained lighting apparatuses according to the various embodiments of the present invention, since each of the light sources can transmit the light emitted from the different light source, the etendue of the light emitted from the lighting apparatus can be smaller than the total etendue of the respective light sources.

A configuration and operation of a projection display apparatus using the aforesaid lighting apparatus of the present invention are explained with reference to the attached drawings as follows.

Figure 9:
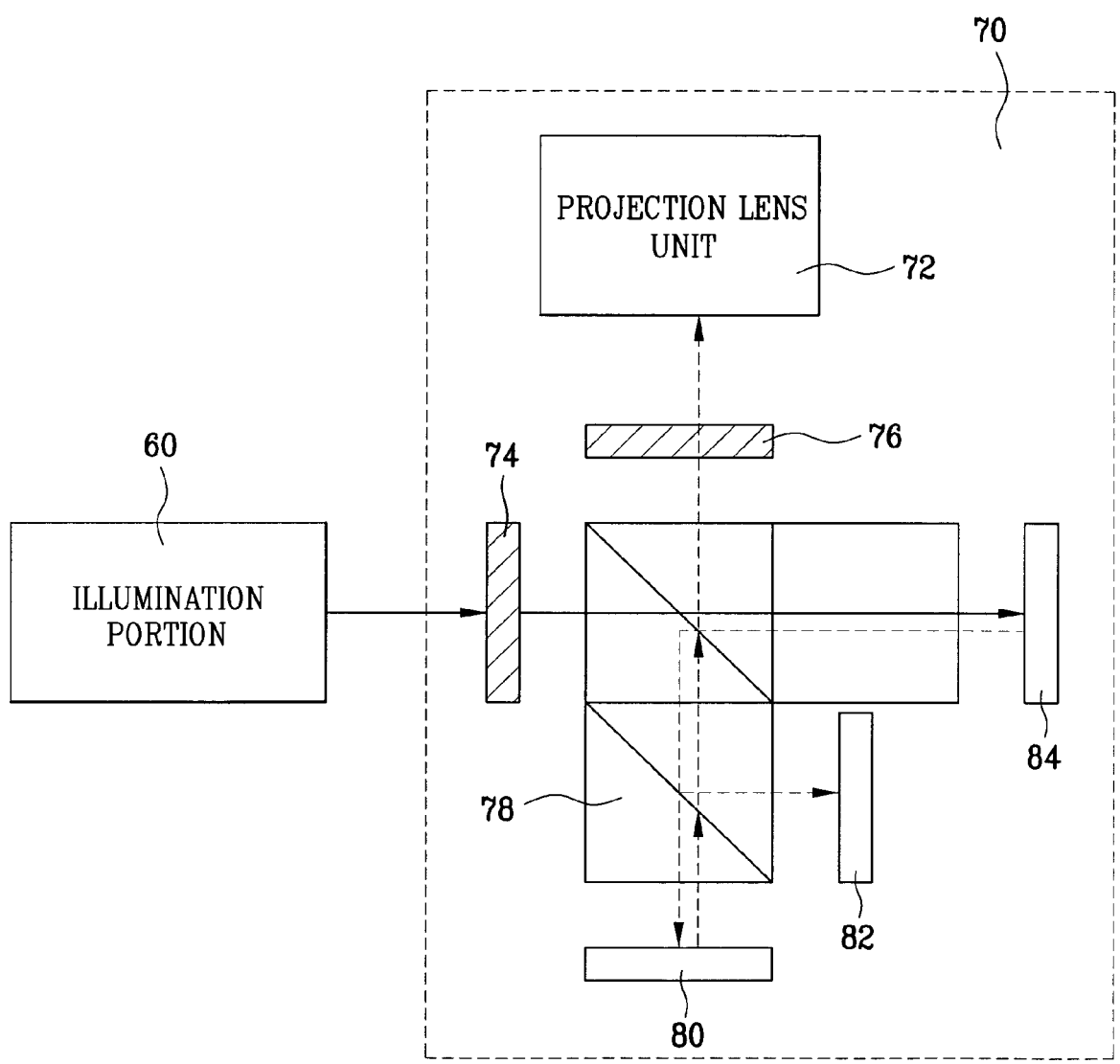
FIG. 9 is a block diagram of a projection display apparatus using a lighting apparatus according to the present invention.

FIG. 9 is a block diagram of a projection display apparatus using a lighting apparatus according to the present invention.

Referring to FIG. 9, a projection display apparatus includes an illumination portion 60 and a projector 70. The projector 70 includes a projection lens unit 72, color selection polarizing plates 74 and 76, a dichroic filter 78, and LCD panels 80, 82 and 84.

And, the illumination portion 60, includes the above-explained lighting apparatus according to the present invention, plays a role as a light source of the projection display apparatus shown in FIG. 9 in applying light to the projector 80.

Figure 10:
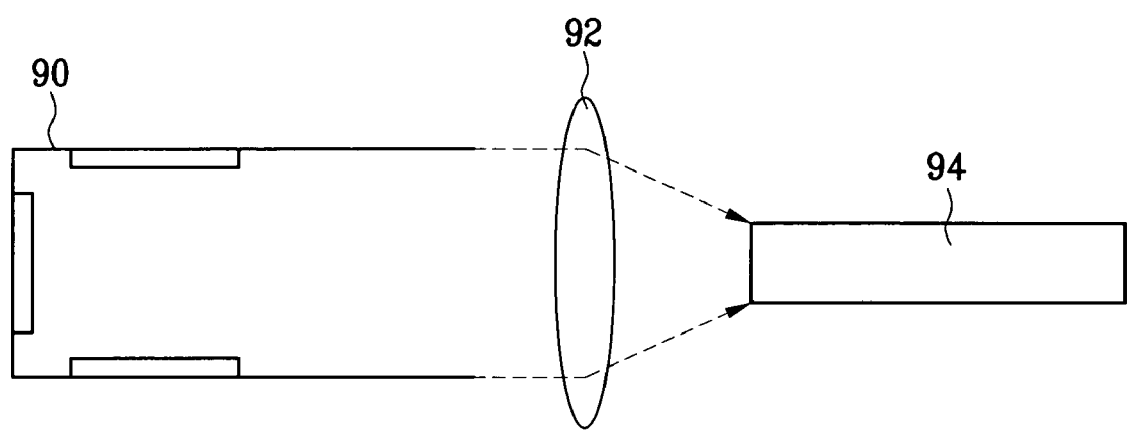
FIG. 10 is a diagram of an illumination apparatus in FIG. 9 according to one embodiment of the present invention.

FIG. 10 is a diagram of an illumination apparatus in FIG. 9 according to one embodiment of the present invention.

Referring to FIG. 10, an illumination apparatus includes a lighting apparatus 90, an illumination lens portion 92 and an integrator [or FEL (fly eye lens)] 94. In this case, the lighting apparatus 90 includes one of the above-explained lighting apparatuses according to various embodiments of the present invention. For convenience of explanation, a reflecting member of the lighting apparatus 90 has a rectangular shape in the drawing but is not limited to the rectangular shape.

The lighting apparatus 90 shown in FIG. 10 emits light and the illumination lens portion 92 sends the light emitted from the lighting apparatus to the integrator 94. Generally, the intensity of the light emitted from the lighting apparatus 90 is not uniform. Namely, the intensity of light is strong on an optical axis and diminishes away from the optical axis. In this case, the integrator 94 plays a role in uniformly applying the light emitted from the illumination lens portion 92 to correspond to a shape of a small-sized imager. In doing so, a separate lens can be used in adjusting a width of the light.

Figure 11:
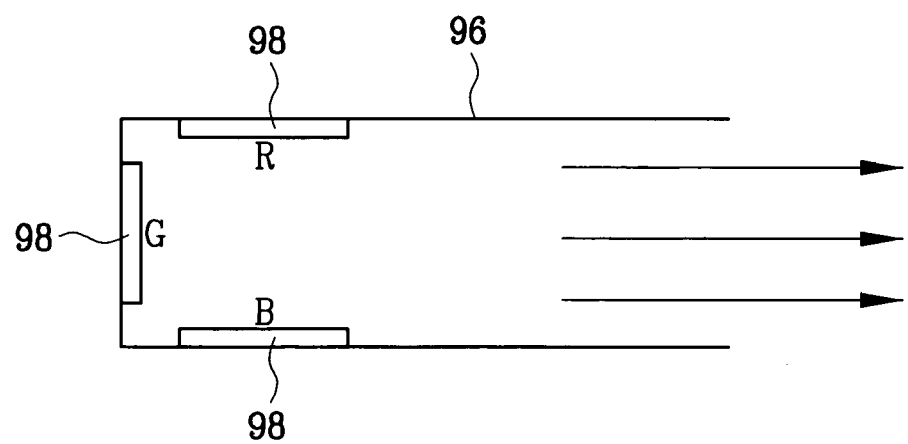
FIG. 11 is a diagram of an illumination portion in FIG. 9 according to another embodiment of the present invention.

FIG. 11 is a diagram of an illumination portion in FIG. 9 according to another embodiment of the present invention.

Referring to FIG. 11, an illumination portion 60 includes a reflecting member 96 and light sources 98.

In the illumination portion 60, the reflecting member 96 can be elongated in order not to be provided with a separate illumination lens portion 92 or integrator 94. Thus, in case that a length of the reflecting member 96 is long enough, light can be uniformly emitted via the light sources 98 (e.g., LEDs) provided within the reflecting member 96. In this case, a width of the reflecting member 96 is preferably reduced. Hence, by eliminating the necessity of the integrator 94 and illumination lens portion 92 by elongating the length of the reflecting member 96, it is able to further simplify the configuration of the projection display apparatus. Moreover, by allowing all or some of the light sources included in the lighting apparatus to emit the lights of the different colors (R, G and B) as shown in FIG. 11 and by controlling the light sources to correspond to color images, it is able to implement the projection display apparatus using the lighting apparatus more simply.

Meanwhile, the projector 70 shown in FIG. 9 plays a role in synthesizing the light emitted from the illumination portion 60 and in enlarging to image the synthesized result. For this, the projector 70, which includes the color selection polarizing plates 74 and 76, the dichroic filter 78 and the LCD panels 80, 82 and 84, diverts a path of the light emitted from the illumination portion 60, configures the per-color images, synthesizes the configured images into one image, and sends the synthesized image to the projection lens unit 72. The projection lens unit 72 then enlarges the synthesized image via the imager to be imaged on a screen.

Figure 12:
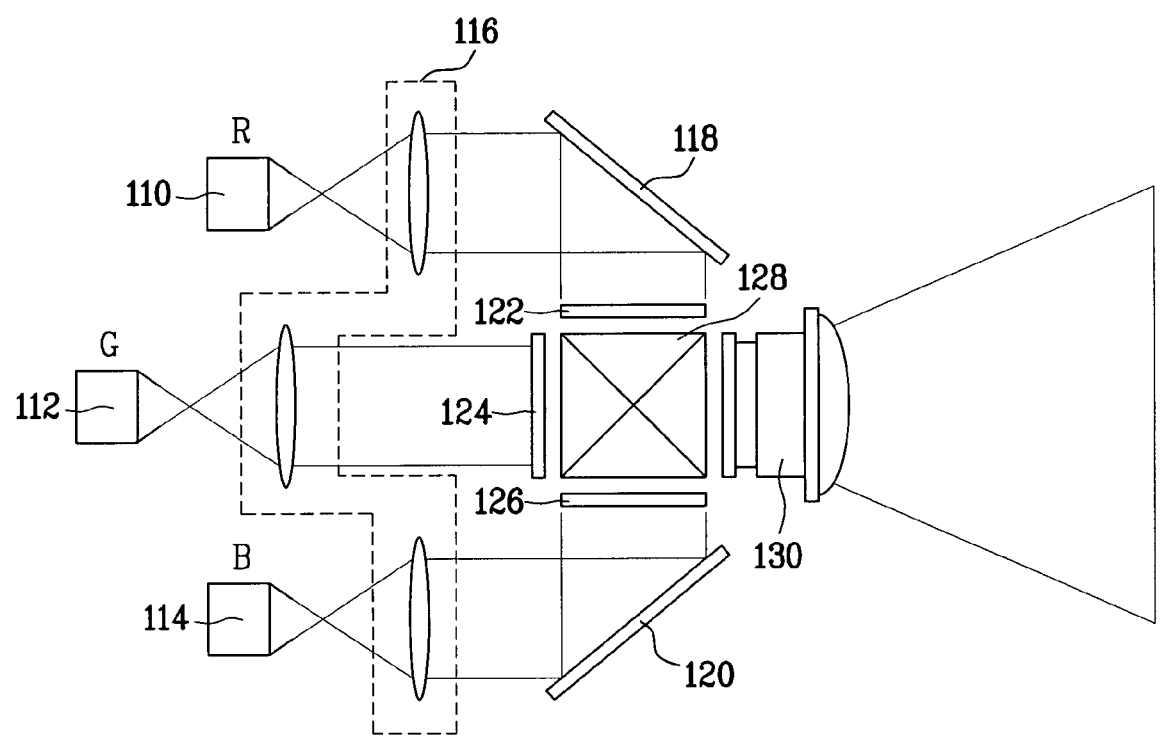
FIG. 12 is a diagram of a transmissive 3-panel projection display apparatus using a lighting apparatus according to an embodiment of the present invention.

FIG. 12 is a diagram of a transmissive 3-panel projection display apparatus using a lighting apparatus according to an embodiment of the present invention.

Referring to FIG. 12, a transmissive 3-panel projection display apparatus includes lighting apparatuses 110, 112 and 114, an illumination lens portion 116, LCD panels 122, 124 and 126, reflecting mirrors 118 and 120, a synthesizing unit 128 and a projection lens portion 130. In this case, elements 116-130 except the lighting apparatuses 110, 112 and 114 play the same role of the projector 70 shown in FIG. 9.

Each of the lighting apparatuses 110, 112 and 114 uniformly emits light of red (R), green (G) or blue (B) to apply the emitted light to the synthesizing unit 128 via the illumination lens portion 116 including various lenses, the reflecting mirror 118 or 120 and the LCD panel 122, 124 or 126. In doing so, the synthesizing unit 128 of an X-type prism synthesizes the lights inputted via the LCD panels 122, 124 and 126. And, the projection lens system 130 enlarges the result synthesized by the synthesizing unit 128 to form an image on a screen.

Figure 13:
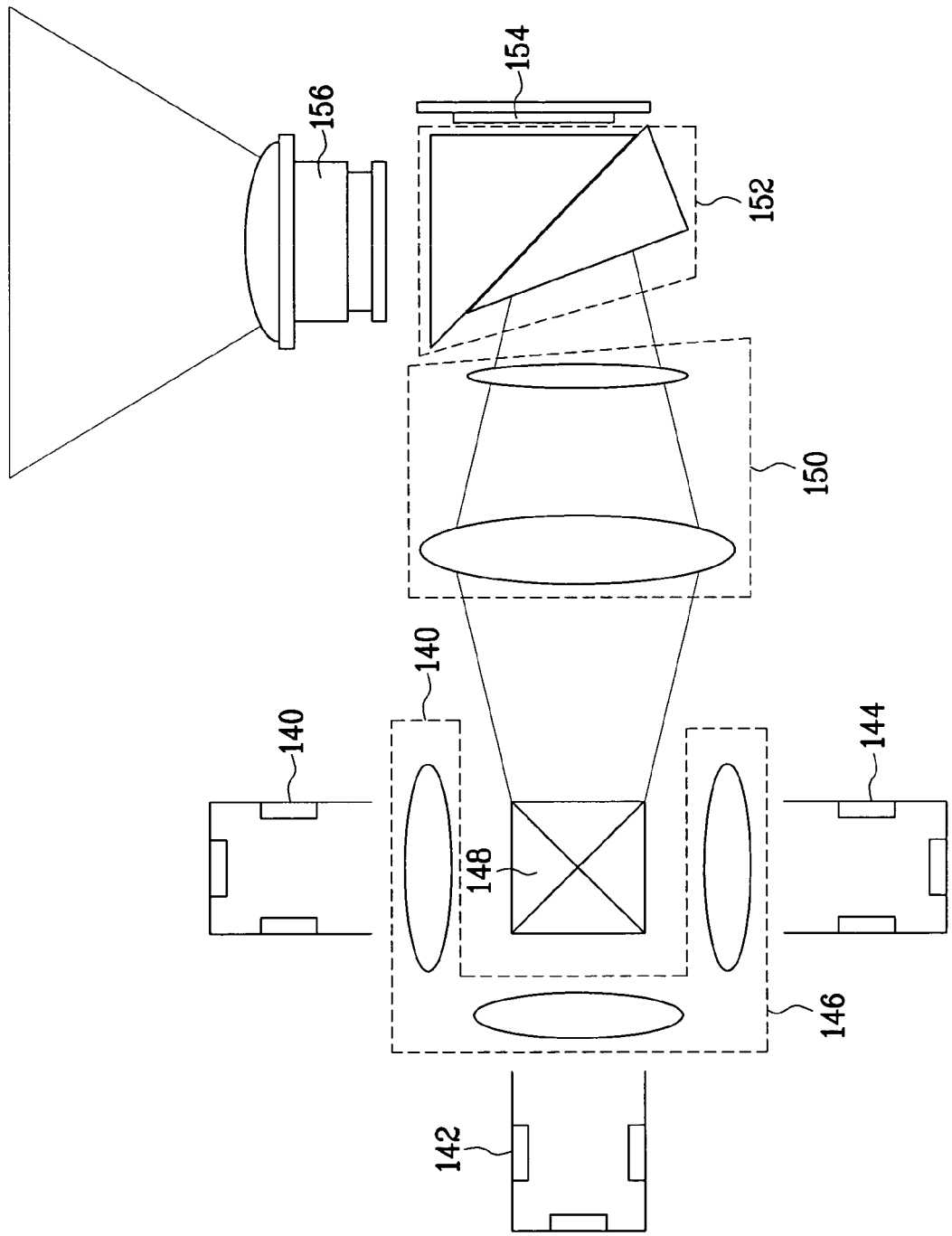
FIG. 13 is a diagram of a DLP 1-panel projection display apparatus using a lighting apparatus according to an embodiment of the present invention.

FIG. 13 is a diagram of a Digital Lighting Processing DLP 1-panel projection display apparatus using a lighting apparatus according to an embodiment of the present invention.

Referring to FIG. 13, a DLP 1-panel projection display apparatus includes lighting apparatuses 140, 142 and 144, illumination lens portions 146 and 150, a synthesizing unit 148, a TIR (Total Internal Reflection) prism 152, an LCD panel 154 and a projection lens portion 156. In this case, elements 146~156 except the lighting apparatuses 140, 142 and 144 play the same role of the projector 70 shown in FIG. 9.

Each of the lighting apparatuses 140, 142 and 144 emits light of red (R), green (G) or blue (B). And, the emitted light is applied to the illumination lens portion 146. The synthesizing unit 148 synthesizes the lights inputted from the lighting apparatuses 140, 142 and 144 via the illumination lens portion 146. And, the synthesized result is passed through the illumination lens portion 150, the TIR prism 152 and the LCD panel 154 and is then enlarged by the projection lens portion 156 to form an image on a screen.

Figure 14:
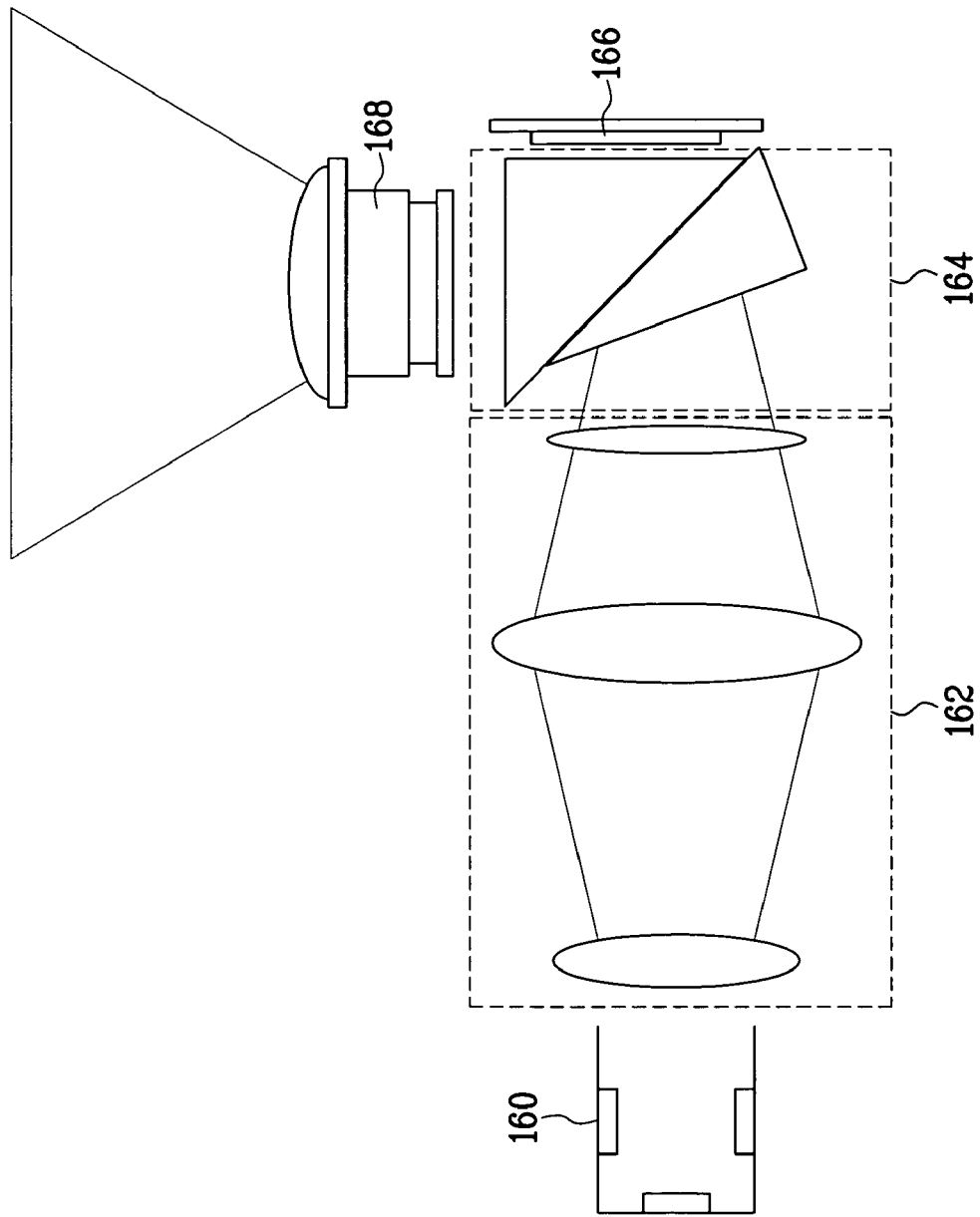
FIG. 14 is a diagram of a projection display apparatus using a lighting apparatus according to another embodiment of the present invention.

FIG. 14 is a diagram of a projection display apparatus using a lighting apparatus according to another embodiment of the present invention.

Referring to FIG. 14, a projection display apparatus includes a lighting apparatus 160, an illumination lens portion 162, a TIR prism 164, an LCD panel and a projection lens portion 168.

The lighting apparatus 160 shown in FIG. 14 includes light sources emitting lights of different colors, respectively. For instance, the lighting apparatus 160 can include LEDs emitting lights of R, G and B. In this case, the necessity for the synthesizing unit 128 or 148, as shown in FIG. 12 or FIG. 13, is eliminated. The illumination lens portion 162, TIR prism 164, LCD panel 166 and projection lens portion 168 shown in FIG. 14 play the same roles of the illumination lens portion 150, TIR prism 152, LCD panel 154 and projection lens portion 156 shown in FIG. 13, respectively, of which detailed explanations are skipped in the following description.

The projection display apparatus shown in FIG. 14 forms per-color images by controlling a plurality of the LED light sources, synthesizes the formed images into one image, and then forms the synthesized image on a screen via the projection lens system 168.

In the related art projection display apparatus, only a white light can be used as a light source for a lighting apparatus. Hence, R, G and B are separated by a separate color separating means and the separated R, G and B are applied to a color synthesizing means. Yet, the projection display apparatus using the lighting apparatus according to the present invention, as shown in FIG. 14, employs the lighting apparatus having the light source applying each of the R, G and B lights (i.e., LED), thereby eliminating the necessity for the separate color separating and synthesizing means. Hence, the present invention basically cuts off the light leaking via the color separating means, thereby enhancing light efficiency.

As mentioned in the foregoing description, the lighting apparatus according to the present invention can minimize the etendue to provide sufficient intensity of light despite a plurality of the light sources.

Accordingly, the projection display apparatus using the lighting apparatus according to the present invention provides the following effects or advantages.

First of all, by being provided with the sufficient light intensity from the lighting apparatus, the projection display apparatus can carry out its functions correctly.

Secondly, by eliminating the necessity for the color separating/synthesizing unit using the lighting apparatus including the light sources that emit lights of different colors, e.g., R, G and B, the projection display apparatus can be implemented with a simple configuration.

Thirdly, by eliminating the necessity for the integrator using the lighting apparatus having the long reflecting member, the projection display apparatus can be implemented with a simple configuration as well.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lighting apparatus comprising:
   a plurality of light sources to emit light, wherein at least one light source transmits at least one of a light emitted from a different light source and a light transmitted through the different light source; and
   a light guiding unit to send light emitted from the light sources and the light transmitted through the light sources in the same direction.

2. The lighting apparatus of claim 1, the light guiding unit comprising a reflecting member enclosing the light sources to reflect light emitted from the light sources and wherein an opening is provided to the reflecting member via which at least one of the emitted light, the transmitted light and the reflected light leaks.

3. The lighting apparatus of claim 2, wherein the reflecting member has a shape selected from the group consisting of a rectangular-parallelepiped box, a peaked-hat box, a cylindrical box, a hemispherical box and a polygonal box.

4. The lighting apparatus of claim 2, wherein an area of the opening is set smaller than a total of surface areas configuring etendue of the light sources.

5. The lighting apparatus of claim 2, wherein a surface of the reflecting member by which the light is reflected is formed of either metal or silicon.

6. The lighting apparatus of claim 2, wherein the light sources are attached parallel in one row to one of inner surfaces of the reflecting member to transmit the light emitted from a neighbor light source.

7. The lighting apparatus of claim 2, wherein the light sources are attached parallel in one row to two of inner surfaces of the reflecting member to transmit the light emitted from a neighbor light source.

8. The lighting apparatus of claim 2, wherein the light sources are attached to different inner surfaces of the reflecting member, respectively.

9. The lighting apparatus of claim 2, further comprising a refractive layer having a refraction index smaller than that of the corresponding light source and greater than that of air to cover at least one of the light sources.

10. The lighting apparatus of claim 9, wherein the reflecting member is filled up with the refractive layer.

11. The lighting apparatus of claim 9, wherein a light-emitting surface of the refractive layer is hemispherical.

12. The lighting apparatus of claim 1, the light guiding unit comprising a plurality of optical units provided between a plurality of light sources, respectively, each guiding the light emitted from a neighbor light source to another neighbor light source.

13. The lighting apparatus of claim 1, wherein each of the plurality of light sources comprises a light emitting diode (LED).

14. The lighting apparatus of claim 1, wherein the plurality light sources emit lights of different colors, respectively.

15. The lighting apparatus of claim 1, further comprising
a projector synthesizing the light emitted from the lighting apparatus, the projector enlarging the synthesized result to form an image.

16. The lighting apparatus of claim 15, wherein the projector comprises one of a reflective 3-panel type, a transmissive 3-panel type and a DLP 1-panel type.

17. The lighting apparatus of claim 15, wherein the projector comprises an imager having an integrator that uniformly applies the light emitted from the lighting apparatus to the imager to correspond to a shape of the imager, wherein the projector enlarges a size of the imager to form an image on a screen.

18. The lighting apparatus of claim 2, further comprising
a projector synthesizing the light emitted from the lighting apparatus, the projector enlarging a synthesized result to form an image.

19. The lighting apparatus of claim 18, wherein a length of the reflecting member included in the lighting apparatus is formed long enough for the light to be uniformly emitted from the reflecting member.

20. The lighting apparatus of claim 15, wherein each of the light sources emits a light of a different color, respectively.

* * * * *